L. B. DE CAMP.
FOOT MOTOR.
APPLICATION FILED SEPT. 30, 1916.
1,233,036.
Patented July 10, 1917.
2 SHEETS—SHEET 2.
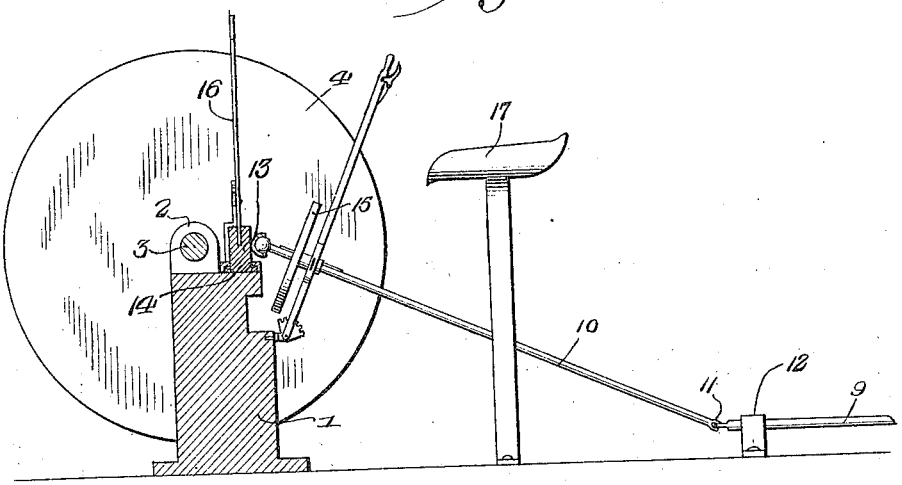
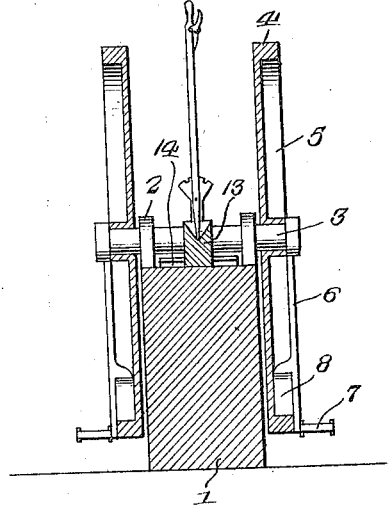
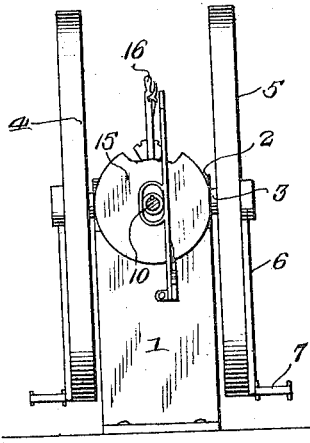
Witnesses
J. H. Crawford
J. W. Garner
Inventor
L. B. DeCamp,
By Victor J. Evans
Attorney

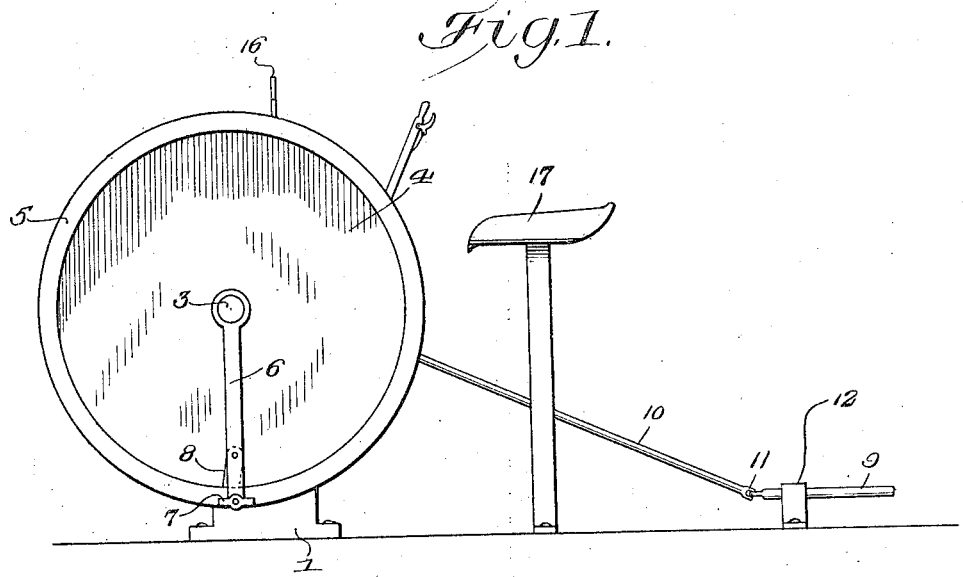
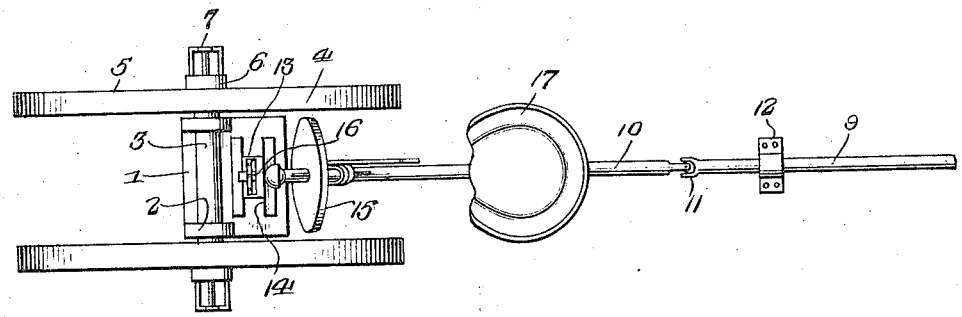
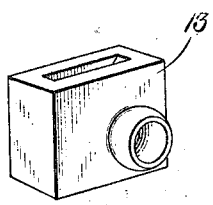

UNITED STATES PATENT OFFICE.

LYMAN B. DE CAMP, OF STINSON BEACH, CALIFORNIA.

FOOT-MOTOR.

1,233,036. Specification of Letters Patent. Patented July 10, 1917.

Application filed September 30, 1916. Serial No. 123,138.

*To all whom it may concern:*

Be it known that I, LYMAN B. DE CAMP, a citizen of the United States, residing at Stinson Beach, in the county of Marin and State of California, have invented new and useful Improvements in Foot-Motors, of which the following is a specification.

This invention is an improved foot motor adapted for use in propelling a boat or for other light power purposes, the object of the invention being to provide an improved motor of this kind which is simple in construction, is strong and durable and which can be readily operated and without excessive fatigue.

The invention consists in the features of construction, combination, and arrangement of devices, hereinafter fully described and claimed.

In the accompanying drawings:—

Figure 1 is a side elevation of a foot motor constructed and arranged in accordance with my invention.

Fig. 2 is a plan of the same.

Fig. 3 is a detail view of one of the friction clutches.

Fig. 4 is a similar view showing the joint in the power transmitting shaft.

Fig. 5 is an end elevation, partly in section.

Fig. 6 is a detailed perspective view of the shiftable bearing.

In the embodiment of the invention, here shown, a supporting pillar 1 is provided which in practice may be of any suitable construction and which has bearings 2 for a shaft 3. A pair of friction disks 4 are secured on the shaft near its ends and each friction disk is provided on its outer side with an annular friction flange 5. A pair of pedal levers 6 are pivotally mounted on the ends of the shaft for movement independently of each other, each lever having a pedal 7 near its lower end and being also provided with a pivotally mounted friction clutch 8. The said friction clutches are adapted to each engage the inner face of one of the flanges 5 and thereby turn the disks and shaft through a portion of a rotation, when the pedal lever is moved in one direction and to disengage the friction flange and move idly thereon when the pedal lever is moved in the reverse direction and hence by simultaneously moving the pedal levers in reverse directions, the friction disks and the shaft 3 may be turned by step by step movement continuously in one direction as will be understood.

The power transmission shaft 9 of a boat propeller or the like is provided with a section 10 which is connected to the shaft by a universal joint 11. A fixed bearing of the shaft 9 is indicated at 12. The shaft section 10 is mounted in a bearing 13 which is shiftable on the pillar 1 between the disks 3, said bearing being here shown as mounted in a guide way 14 with which the pillar is provided. A friction wheel 15 is slidably fitted to the shaft section 10 by a spline and may be engaged with either of the friction disks and when the shaft section 10 is arranged mid-way between the friction disks, said friction wheel 15 is out of engagement with both of them. A lever 16 is here shown for shifting the shaft section 10 to cause the friction wheel to engage either of the friction disks and hence cause the power transmission shaft to be turned in either direction desired according to whether it is desired to propel the boat ahead or astern.

My improved motor may be readily operated by a person seated on a seat 17 above the shaft 9 and is adapted to be used not only for propelling a boat or the like but also for driving any kind of light machinery.

From the foregoing description, taken in connection with the accompanying drawings, the advantages of construction and of the method of operation will be readily apparent to those skilled in the art to which the invention relates, and while I have described the principles of operation of the device together with the device which I now consider to be the best embodiment thereof, I desire to have it understood that the device shown is merely illustrative and that such changes may be made when desired as are within the scope of the appended claim.

Having described the invention, what is claimed is:

In a motor of the class described, a pillar, bearings thereon, a shaft mounted in said bearings and provided with a pair of spaced elements, means to rotate said spaced elements and shaft, a bearing slidably mounted on said pillar, a shaft a fixed bearing therefor, a second shaft flexibly connected to the shaft in the fixed bearing, a universal joint connecting the second named shaft to the slidably mounted bearing, a friction wheel shiftably mounted on the second named shaft, a lever to move said movable bearing to cause said friction wheel to engage either of the spaced elements and a lever to shift said friction wheel on the second named shaft toward and from the centers of said spaced elements.

In testimony whereof I affix my signature.

LYMAN B. DE CAMP.

Copies of this patent may be obtained for five cents each, by addressing the "Commissioner of Patents, Washington, D. C."